United States Patent Office 2,757,276
Patented July 31, 1956

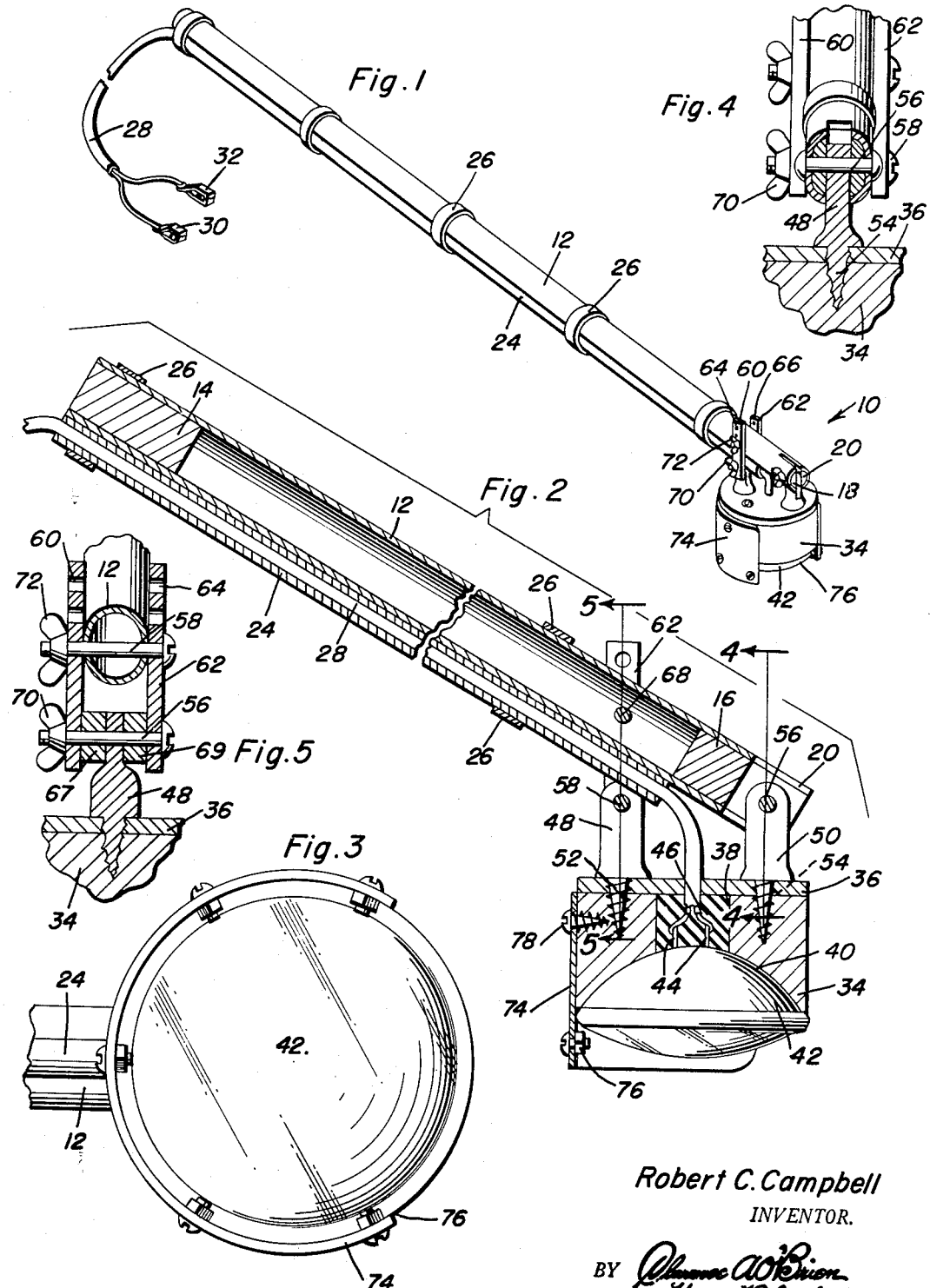

2,757,276

FISHING LIGHT

Robert C. Campbell, Jacksonville, Fla.

Application July 13, 1954, Serial No. 442,988

6 Claims. (Cl. 240—26)

This invention relates to a fishing light and more particularly to a device adapted to be utilized at night for attracting fish while illuminating a considerable area to thereby permit fish to be speared or otherwise caught with greater facility.

The primary object of the present invention resides in the provision of a highly efficient fishing light which is capable of being submerged beneath the surface of the water so that a greater area thereof can be illuminated, and which is capable of ready adjustment for various angular positions while employing a sealed beam type lamp which can be excited by current supplied from an automobile storage battery to which the fishing light is connected by elongated conductors.

The construction of this invention especially features an annular seating block formed of cypress or like material which will not swell too greatly when immersed in water and against which a sealed beam lamp can be seated. The contacts of the sealed beam lamp extend into a central aperture in the seating block, and a filling of electrically insulative meltable substance is utilized to waterproof the connection between the sealed beam lamp and the conductors utilized to connect the lamp to a source of electrical energy. Additionally, means are provided for pivotally mounting the seating block in a manner whereby the lamp can be adjusted so that the rays emitted therefrom can be directed in the selected direction desired.

Still further objects and features of this invention reside in the provision of a fishing light that is strong and durable, extremely light in weight, capable of being readily immersed in water with little likelihood of deterioration thereof, and which is inexpensive to construct, thereby permitting wide distribution and utilization.

These, together with the various ancillary objects and features of the invention which will become apparent as the following description proceeds, are attained by this fishing light, a preferred embodiment of which has been illustrated in the accompanying drawings, by way of example only, wherein:

Figure 1 is a perspective view of the fishing light comprising the present invention;

Figure 2 is an enlarged sectional detailed view of the fishing light illustrating the construction of the sealing block and the connection between the conductor and the contacts of the sealed beam type lamp in greatest detail;

Figure 3 is a partial bottom plan view of the fishing light;

Figure 4 is a sectional detail view, as taken along the plane of line 4—4 in Figure 2 illustrating the construction of the mounting studs; and Figure 5 is a sectional detail view as taken along the plane of line 5—5 in Figure 2.

With continuing reference to the accompanying drawings wherein like reference numerals designate similar parts throughout the various views, reference numeral 10 generally designates the improved fishing light comprising the present invention which includes an elongated tubular handle 12 constructed from aluminum or other suitable material and having the ends thereof sealed by blocks, as at 14 and 16, it being noted that the block 16 does not extend fully to the end of the handle 12 and that the end of the handle 12 is bifurcated to form furcations 18 and 20.

A tubular conduit 24 also formed from a suitable light weight substance such as aluminum is provided and is attached to the handle 12 and forms a part thereof by means of bands 26 which may be formed of friction tape or other similar substance and then painted thereover. Extending through the conduit 24 are sheathed conductors 28 which have alligator clips, as at 30 and 32, at the ends thereof for connecting the conductors 28 and, hence, the entire fishing light to a source of electrical energy, such as an automobile storage battery or the like.

The fishing light further includes a seating block 34 formed preferably of cypress. A brass mounting plate 36 is fastened to the seating block 34. The mounting plate 36 can be made of any other suitable material, as may be desired. The mounting plate 36 overlies the central aperture 38 extending through the seating block 34 which is also provided with a concave or dished out surface indicated at 40. The surface 40 forms a seat for a sealed beam type lamp 42 which has the contacts 44 thereof connected to the conductors 28 within the aperture 38. A filling of electrically insulative and meltable substance 46 is positioned in the aperture 38 for embedding the contacts 44 and the conductors 28 therein so as to assure a waterproof connection.

The mounting plate 36 has a pair of mounting studs 48 and 50 which have screw threaded portions 52 and 54 which threadedly secure the mounting studs 48 and 50 on the mounting plate 36, the screw threaded portions 52 and 54 also being threadedly engaged in the seating block 34.

The mounting stud 50 extends between the furcations 18 and 20 of the handle 12 and is pivotally attached to the handle by means of a pin 56. Pivotally attached by means of a bolt 58 to the mounting stud 48 are a pair of support plates 60 and 62 each of which is provided with a plurality of apertures 64 and 66, respectively, therethrough. The apertures 64 and 66 are vertically spaced and a bolt 68 extends through the handle 12 to adjustably attach the handle 12 to the plates 60 and 62. A pair of shims 67 and 69 may be provided.

Wing nuts 70 and 72 are provided for adjusting the bolts 58 and 68 to permit an angular adjustment of the handle 12 with respect to the lamp 42.

In order to prevent the lamp 42 from falling away from the seating block 34 should the meltable material 46 for some reason not hold the contacts 44 embedded therein, there is provided a shield 74 which extends substantially around the lamp 42 terminating at the front portion thereof, which not only acts as a reflector but carries a plurality of nut and bolt combinations 76 which serve as stop members for preventing the lamp 42 from falling completely out from engagement with the seating block 34, thus assuring against loss of the lamp 42. It is to be noted that the low melting point material 46 may be tar or such material as is usually utilized for roofing and the like. The shield or reflector 74 may be secured to the block 34 by suitable screw fasteners 78 or the like.

The fishing lamp is adapted to be placed below the surface of the water at a selected angle to provide illumination in any direction, as may be desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fishing light comprising an annular seating block, an illuminating source seated in said block, a mounting plate overlying said block, a pair of mounting studs extending through said mounting plate secured to said block holding said mounting plate on said block, an elongated handle angularly adjustably secured to said studs, said handle including a tubular conduit, and conductors connected to said illuminating source extending through and beyond said conduit for connecting said illuminating source to a source of electrical energy, a reflector secured to said seating block, and stop means extending inwardly of said reflector to prevent said illuminating source from falling outwardly from said seating block.

2. A fishing light comprising an annular seating block, an illuminating source seated in said block, a mounting plate overlying said block, a pair of mounting studs extending through said mounting plate secured to said block holding said mounting plate on said block, an elongated handle angularly adjustably secured to said studs, said handle including a tubular conduit, and conductors connected to said illuminating source extending through and beyond said conduit for connecting said illuminating source to a source of electrical energy, said seating block having a centrally disposed aperture therethrough, said source of illumination having contacts extending into said aperture, said conductors being secured to said contacts, and a meltable electrically insulative substance filling said aperture embedding said contacts therein.

3. A fishing light comprising an annular seating block, an illuminating source seated in said block, a mounting plate overlying said block, a pair of mounting studs extending through said mounting plate secured to said block holding said mounting plate on said block, an elongated handle angularly adjustably secured to said studs, said handle including a tubular conduit, and conductors connected to said illuminating source extending through and beyond said conduit for connecting said illuminating source to a source of electrical energy, said handle having a bifurcated portion, a first of said studs extending between the furcations of said bifurcated end portion with said bifurcated end portion pivotally attached to said first stud, the other of said studs having a pair of support plates pivotally secured thereto, aligned holes in said support plates, and means adjustably attaching said support plates to said handle extending through a selected pair of said aligned holes.

4. A fishing light comprising an annular seating block, an illuminating source seated in said block, a mounting plate overlying said block, a pair of mounting studs extending through said mounting plate secured to said block holding said mounting plate on said block, an elongated handle angularly adjustably secured to said studs, said handle including a tubular conduit, and conductors connected to said illuminating source extending through and beyond said conduit for connecting said illuminating source to a source of electrical energy, a reflector secured to said seating block, and stop means extending inwardly of said reflector to prevent said illuminating source from falling outwardly from said seating block, said seating block having a centrally disposed aperture therethrough, said source of illumination having contacts extending into said aperture, said conductors being secured to said contacts, and a meltable electrically insulative substance filling said aperture embedding said contacts therein.

5. A fishing light comprising an annular seating block, an illuminating source seated in said block, a mounting plate overlying said block, a pair of mounting studs extending through said mounting plate secured to said block holding said mounting plate on said block, an elongated handle angularly adjustably secured to said studs, said handle including a tubular conduit, and conductors connected to said illuminating source extending through and beyond said conduit for connecting said illuminating source to a source of electrical energy, said seating block having a centrally disposed aperture therethrough, said source of illumination having contacts extending into said aperture, said conductors being secured to said contacts, and a meltable electrically insulative substance filling said aperture embedding said contacts therein, said handle having a bifurcated end portion, a first of said studs extending between the furcations of said bifurcated end portion with said bifurcated end portion pivotally attached to said first stud, the other of said studs having a pair of support plates pivotally secured thereto, aligned holes in said support plates, and means adjustably attaching said support plates to said handle extending through a selected pair of said aligned holes.

6. A fishing light comprising an annular seating block, an illuminating source seated in said block, a mounting plate overlying said block, a pair of mounting studs extending through said mounting plate secured to said block holding said mounting plate on said block, an elongated handle angularly adjustably secured to said studs, said handle including a tubular conduit, and conductors connected to said illuminating source extending through and beyond said conduit for connecting said illuminating source to a source of electrical energy, a reflector secured to said seating block, and stop means extending inwardly of said reflector to prevent said illuminating source from falling outwardly from said seating block, said seating block having a centrally disposed aperture therethrough, said source of illumination having contacts extending into said aperture, said conductors being secured to said contacts, and a meltable electrically insulative substance filling said aperture embedding said contacts therein, said handle having a bifurcated end portion, a first of said studs extending between the furcations of said bifurcated end portion with said bifurcated end portion pivotally attached to said first stud, the other of said studs having a pair of support plates pivotally secured thereto, aligned holes in said support plates, and means adjustably attaching said support plates to said handle extending through a selected pair of said aligned holes.

References Cited in the file of this patent

UNITED STATES PATENTS

| 783,730 | McMahon | Feb. 28, 1905 |
| 1,172,306 | Parker et al. | Feb. 22, 1916 |
| 1,611,651 | Leavitt | Dec. 21, 1926 |

FOREIGN PATENTS

| 109,612 | Switzerland | Apr. 1, 1925 |